Sept. 1, 1964 S. HOPFER 3,147,436
SYMMETRICAL THERMOPILE CIRCUIT FOR MEASURING
ELECTROMAGNETIC WAVE ENERGY
Filed June 19, 1962 2 Sheets-Sheet 1
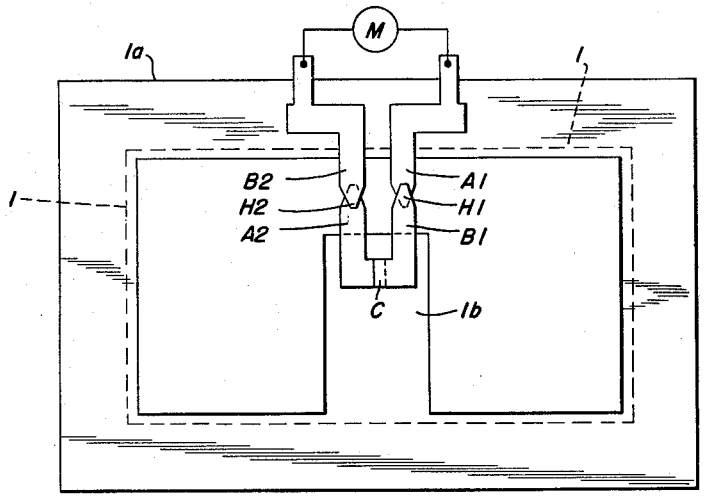
*Fig. 1.*
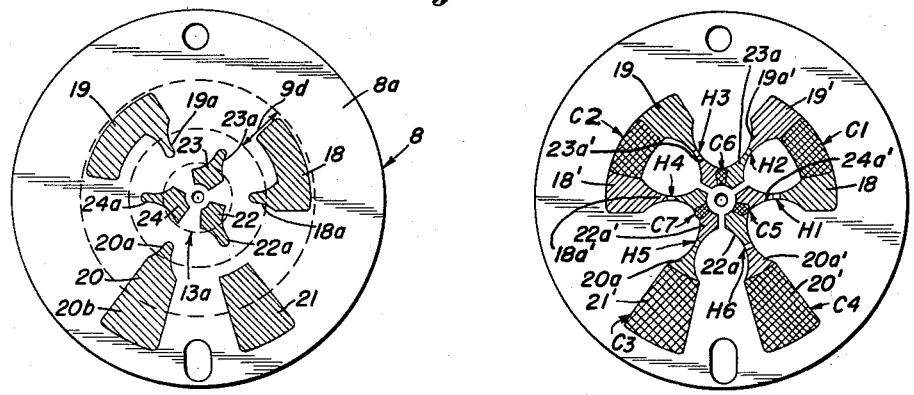
*Fig. 3.*
*Fig. 4.*
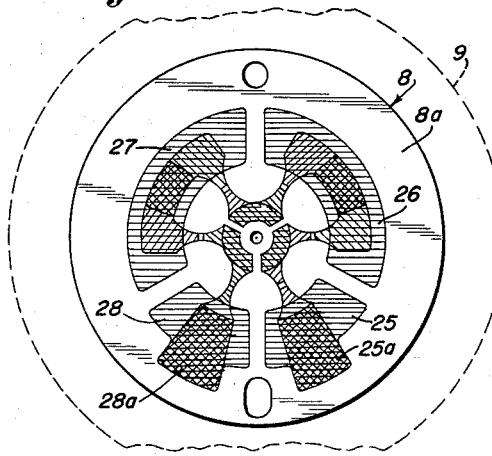
*Fig. 5.*
INVENTOR
SAMUEL HOPFER
BY *Kemon, Palmer, Stewart & Estabrook*
ATTORNEYS INVENTOR
SAMUEL HOPFER
BY Kenyon Palmer, Stewart
& Estabrook
ATTORNEYS

United States Patent Office 3,147,436
Patented Sept. 1, 1964

3,147,436
SYMMETRICAL THERMOPILE CIRCUIT FOR MEASURING ELECTROMAGNETIC WAVE ENERGY
Samuel Hopfer, Brooklyn, N.Y., assignor to PRD Electronics, Inc., Brooklyn, N.Y., a corporation of New York
Filed June 19, 1962, Ser. No. 203,618
6 Claims. (Cl. 324—95)

This invention is concerned with devices for measuring electric wave energy within the microwave band.

One object of the invention is to provide a power measuring device having a broadband characteristic within the microwave band.

Another object is to devise a power measuring device which produces a direct or absolute indication of the power and does not require balancing against a dummy device.

Still another object is to provide a power measuring device which is substantially free of drift effects due to changes in ambient temperature.

The objects of this invention are attained by the use of a thermopile formed of an even numbered pair of thermo-electric elements or thermocouples, each thermocouple being formed of a junction between two resistive strips of thin metal films of different metals. A portion of each resistive strip on each side of each junction is located within the electromagnetic field of the wave energy to be measured and absorbs energy from the field to elevate the temperature of the hot junction in each thermocouple in dependence upon the strength of the field. By forming the thermoelectric elements of metal films of very small thickness, the response is made relatively independent of the frequency of the electric field. It is preferred that the thickness of the films be relatively small with respect to the skin depth or depth of penetration of the microwave current at the highest operating frequency.

The other portions of the metal strips of each thermocouple forming the cold junctions in the thermopile are maintained in good heat transfer contact with an isothermal mass which is subject to slow variation in temperature with changes in ambient temperature. The arrangement is such that the output of the thermopile is not substantially effected by changes in ambient temperature. Usually a number of cold junctions will have good heat transfer contact with one isothermal mass, and the remaining cold junctions will have good heat transfer contact with a second isothermal mass which may be at a different temperature from the first mass, but it is possible to design the arrangement so that the temperature of the hot junction located between the two masses corresponds to the average temperature of the two masses, and there will be zero output from the thermopile in the absence of microwave energy.

Another feature of the invention is the formation of the thermopile as a thin flat unit which may be clamped between adjacent sections of a waveguide or coaxial cable, the arrangement being such that the cold junctions are properly grouped to have good thermal contact with appropriate isothermal masses at opposite boundaries of the electromagnetic field, while the hot junctions are located within the electromagnetic field.

The present invention is suitable for use in measuring wave energy transmitted through either waveguides or coaxial cables.

Suitable embodiments of the invention are illustrated in the accompanying drawing in which:

FIGURE 1 shows one arrangement for measuring wave energy transmitted through a waveguide;

FIGURES 3, 4 and 5 are views of three steps in the formation of the thermopile unit used in FIGURE 2.

Figure 2:
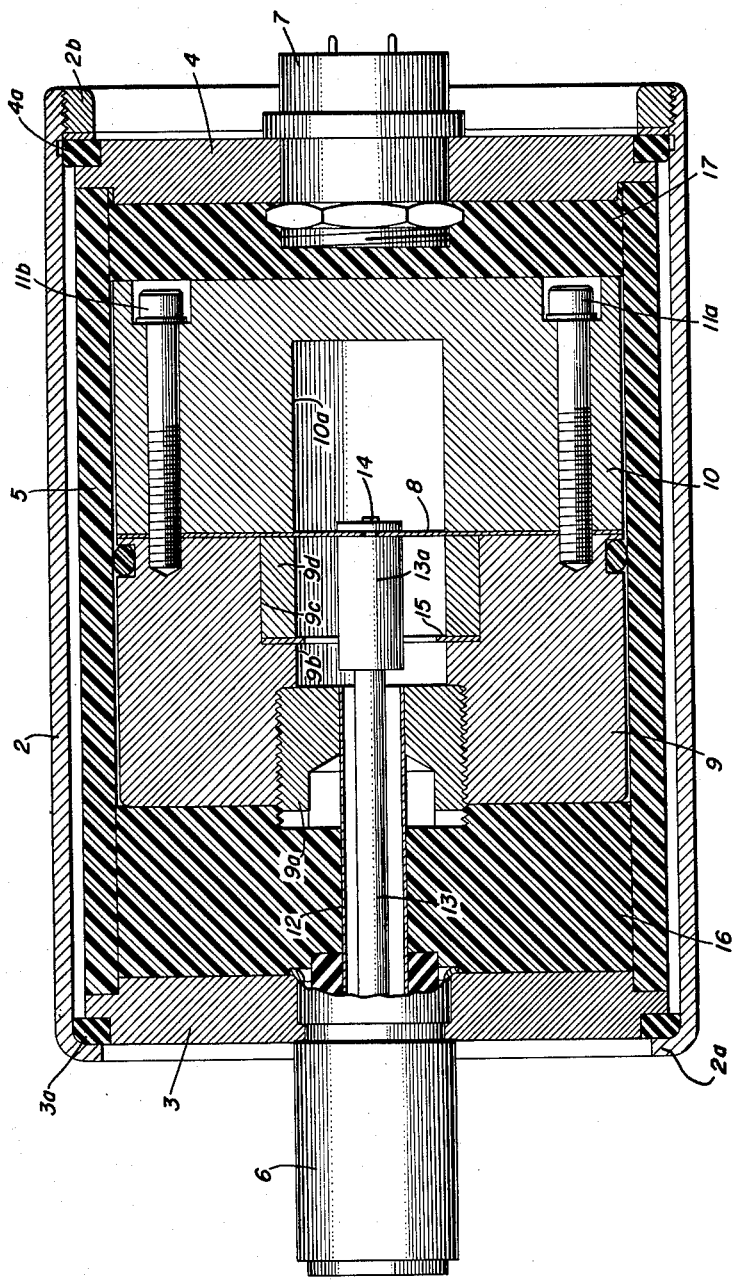
FIGURE 2 is a longitudinal sectional view of the power measuring device for measuring wave energy transmitted through a coaxial cable.

FIGURE 1 of the drawing shows a simple form of thermopile for use in measuring the energy in a rectangular waveguide, this figure being an end view of a section of waveguide 1 having a coupling flange 1a providing a flat coupling surface at the end of the section and forming a heat-sink or isothermal mass which responds slowly to changes in ambient temperature. The waveguide also includes a ridge 1b which has a flat surface in the same plane with the flat surface of the flange 1a and forms a second heat-sink or isothermal mass which changes in temperature slowly with changes in ambient temperature. The ridge 1b may be continuous throughout the length of the rectangular waveguide, or it may constitute a short matching ridge tapered in height along the length of the waveguide. The simple thermocouple in FIGURE 1 is formed of two hot junctions H1 and H2 and a cold junction C. The hot junction H1 is formed between a thin strip of antimony A1 and a thin strip of bismuth B1 arranged with their ends in overlapping relation at H1 and extending across the gap between the edge of the ridge 1b and the upper wall of the waveguide. In a like manner the hot junction H2 is formed by the overlapping ends of a strip of antimony A2 and a strip of bismuth B2 extending across the gap between the upper edge of the ridge 1b and the upper wall of the waveguide. The lower ends of strips B1 and A2 are arranged in overlapping relation to form the cold junction C. The upper ends of strips A1 and B2 are extended and connected to two terminals to which the indicating meter M are connected.

It will be understood that the thermopile is formed as a separate unit supported upon a thin sheet of dielectric material which is clamped between the flange 1a of the waveguide 1 and a similar flange of an adjacent section of the waveguide which is clamped to the flange 1a by suitable securing means. The adjacent section provides a suitable termination for waveguide section 1. The strips forming the thermopile may be insulated from the two flanges and the end surfaces of the ridges by thin sheets of insulation interposed between the metallic surfaces and the thermopile, or the flat faces of the flanges and the ridges may be anodized to accomplish the same purpose. It will be noted that the strips forming the hot junctions H1 and H2 are located within the gap between the upper edge of ridge 1b and the top wall of the waveguide so that these strips are positioned within a strong electromagnetic field which induces currents in the strips and the energy loss produced by such currents in the resistive strips raises the temperature of the hot junctions H1 and H2 above the temperature of the heat-sink masses in dependence upon the strength of the field. It will be noted that the strip portions forming the two hot junctions are arranged in parallel with respect to the microwave energy existing in the waveguide, whereas they are connected in series in the output or D.C. circuit which includes the indicating meter M. The cold junction C, and the portions of the strips which are clamped between the waveguide flanges and between adjacent sections of the ridge 1b will be maintained substantially at the temperature of these masses, and the current produced by the hot junctions through the meter M will provide a reliable indication of the amount of microwave energy existing in the waveguide. The ridge 1b may not be at the same temperature as the flange 1a, but by properly designing the thermocouple strip this difference in temperature will not cause any current flow in the meter M.

FIGURE 2 shows a power meter according to the present invention for directly indicating the power existing in a coaxial cable. The meter is enclosed within an outer casing 2 formed of suitable metal such as copper or aluminum alloy. This casing preferably is of cylindrical form and is closed at one end by a front plate 3 and at the other end by a rear plate 4, both of metal such as copper or aluminum alloy. These end plates also close the ends of an inner isolating casing 5 which may be formed as a tube of phenolic compound. A coaxial cable input coupling 6 is mounted at the center of end plate 3, and a two-conductor output coupler 7 is mounted at the center of end plate 4.

The thermopile is formed of a thin flat unit indicated generally at 8 in FIGURE 2 and illustrated in greater detail in FIGURES 3 to 5. This unit is of circular form and is mounted within casing 5 between a front block 9 and a rear block 10 of a heat-sink or isothermal mass. These blocks are formed of metal of good heat conductivity, such as copper or aluminum alloy. The thermopile unit 8 is clamped between the metallic blocks 9 and 10 by suitable means such as screws 11a and 11b.

The outer conductor 12 of the coaxial cable extends from the input connector 6 into the casing 5 and the inner end thereof is connected to heat sink 9 by a sleeve 9a threaded into a bore in the block 9. The inner conductor 13 of the coaxial cable extends beyond the end of conductor 12, beyond the sleeve 9a, and into the enlarged bore 9b behind the sleeve 9a and terminates in an enlarged section 13a which has an end surface located in the same plane as the rear face of block 9. The center portion of the thermopile unit 8 is clamped against the end of the center conductor section 13a by a screw 14 having an enlarged head pressing against the rear face of the unit 8, the screw passing through the center of the unit 8 and having threaded engagement with a central bore in the section 13a. Conductor section 13a may be replaced by another section having a different external diameter. An annular ring 15 having a smaller internal diameter than the bore 9b surrounds the conductor section 13a a short distance from its front end and forms a matching iris for the coaxial cable section contained within the bore 9b. In order that this ring may be replaceable to match a section 13a of a different diameter, the ring is mounted within a counter bore 9c formed in block 9 with a larger diameter than the bore 9b, and a spacer ring 9d fits snugly within the counterbore 9c and holds the ring 15 in position. The rear face of spacer ring 9d is in the same plane as the rear face of block 9.

The heat sink block 10 has a bore 10a formed in the front face thereof and of the same diameter as the bore 9b in block 9. This bore forms a suitable termination for the enlarged coaxial section contained within the bore 9b, and it serves as a cut-off section.

The isothermal mass formed of blocks 9 and 10 is held in position within the isolating casing 5 by a front block 16 and a rear block 17, both formed of a resilient dielectric material such as poly-foam or eccoform. The inner casing 5 with end plates 3 and 4 are mounted within outer casing 2 by resilient rings 3a and 4a located in annular grooves formed at the front of plate 3 and rear of plate 4. Ring 3a seats on an internal flange 2a on casing 2, and ring 4a is held in place by a ring 2b threaded into the rear end of casing 2.

The thermopile unit 8 is constructed in the manner illustrated in FIGURES 3 to 5. As shown in FIGURE 3, the necessary thin films of one metal (bismuth) are deposited by thermal evaporation upon one face of a thin disc of plastic material. For example, the disc 8a may be formed of Mylar and have a thickness of the order of one-quarter of a mil. The outer diameter of disc 8a is somewhat less than the spacing between screws 11a and 11b which clamp blocks 9 and 10 together. Seven thin film areas of bismuth are deposited on disc 8a through a mask of the proper shape. Two films 18 and 19 cover arcuate areas located opposite the rear end of the spacer ring 9d which is shown in dotted lines in FIGURE 3. These films have narrow finger extensions 18a and 19a extending radially inward towards the center of the disc 8a. A third film 20 carrying a similar finger 20a is deposited in a position so that the fingers 18a, 19a, and 20a are equally distributed about the center of the disc 8a. Deposit 20 has a terminal portion 20b extending beyond the outer periphery of the ring 9d. Another terminal film deposit 21 is located on the opposite side of the vertical axis from the film deposit 20, but this deposit is not provided with a radial finger. Three other bismuth film deposits 22, 23 and 24 of arcuate shape are applied to the face of disc 8a near the center of the disc. The main bodies of these deposits are located within the outer periphery of center conductor section 13a, shown in dotted lines, but these deposits have finger extensions 22a, 23a and 24a extending radially outwardly beyond conductor section 13a as shown.

Using the same mask, but reversed about the vertical axis, seven more deposits of thin metal films are applied to the same side of disc 8a, using a different metal (antimony) from that used in depositing the first set of films. Since the antimony deposits are of the same shape as the bismuth films they are marked in FIGURE 4 with the reference numerals primed. From FIGURE 4 it will be seen that the bismuth fingers and the antimony fingers overlap at their ends to form six hot junctions H1 to H6. The finger pairs forming these junctions are: 18a–24a', 19a–23a', 20a–22a', 22a–20a', 23a–19a', and 24a–18a'. These hot junctions are approximately midway between the outer boundary of center conductor section 13a and the boundary of bores 9b and 10a, and are located within the electromagnetic field existing in the annular space between these two boundaries. The varying field causes eddy currents to be generated in the finger strips on each side of the hot junctions which elevate the temperature of these junctions with respect to the other junctions which are the "cold" junctions marked C1 to C7 in FIGURE 4.

As will be seen in FIGURE 4 the outer cold junctions C1 to C4 are formed in locations which are covered by the opposing faces of heat-sink 9 and 10. These cold junctions are formed by overlapping parts of bismuth and antimony arcuate deposits in the following pairs: 18–19', 19–18', 20–21' and 21–20'.

As shown in FIGURE 4, the seven cold junctions and six hot junctions are arranged in series circuit relation between terminal deposits 20' and 21', so that the voltages developed at the hot junctions are cumulative in effect at the terminal deposits. It will be seen that the finger strips forming the hot junctions are in effect connected in parallel across the electric field in which they are located.

The final step in forming the thermopile unit is illustrated in FIGURE 5 where four other thin film deposits 25, 26, 27 and 28, of good conductivity metal such as silver or gold, are applied over the cold junction regions of the thermopile. These additional deposits are arcuate in shape with their internal arcuate boundaries being of substantially the same diameter as the diameter of the bores 9b and 10a, and their outer arcuate boundaries being somewhat larger than the outer diameter of ring 9d. In each case, the arcuate deposit extends beyond the cold junction area, so that adjacent deposits are separated by relatively small gaps as shown in FIGURE 5. Deposits 25 and 28 are extended outwardly to cover the entire area of terminal deposits 20' and 21' and to provide terminal portions 25a and 28a. A cover sheet of thin insulating material may be applied on top of the three metal layers, with suitable holes provided for access to the terminal portions 25a and 28a.

It will be understood that output terminal portions 25a and 28a of the thermopile unit are connected by suitable connections to the two conductors in the output connector 7. This may be accomplished by the use of well known spring-pressed contact pins mounted by suitable insulation within bores formed in block 10 and positioned to engage the terminal portions 25a and 28a, with suitable leads connecting the contacts to the connector 7.

From the foregoing it will be seen that in both forms of the invention illustrated herein, the individual hot junctions of the thermopile are formed by overlapping ends of thin metal-film strips of different metals, the two strips of each hot junction being connected between conducting surfaces which form opposing boundaries for the electric field of the wave energy to be measured, with the hot junctions located between such boundaries.

In FIGURE 1 the strips forming the hot junctions H1 and H2 are connected in parallel between the upper wall of waveguide 1 and the ridge 1b which form boundaries for a portion of the electric field within the waveguide. In FIGURES 2 to 5 the strips forming hot junctions H1 to H6 are connected in parallel relation between the inner conductor section 13a and the ring 9d which form boundaries of the radial electric field surrounding the conductor section 13a. The hot junctions are connected in series circuit relation by overlapping film portions forming cold junctions which are held in good heat transfer relation with two isothermal masses or heat-sinks located outside of the field boundaries.

In FIGURE 1 the strip portions forming the cold junction C are held in good heat transfer relation with the end of ridge 1b and the end of the ridge in the adjacent section, which ridges constitute heat sinks. Any other cold junctions involved by reason of the inclusion of additional hot junctions would be held in good heat transfer contact with the flange 1a and the flange of an adjacent section which flanges constitute heat sinks. In FIGURES 2 to 5 the inner cold junctions C5, C6 and C7 are maintained in good heat transfer contact with the rear face of enlarged conductor section 13a which acts as a heat sink, and the outer cold junctions C1 to C4 are maintained in good heat transfer contact with blocks 9 and 10, including ring 9d forming part of block 9.

In the appended claims the term "hollow-conductor waveguide" is used in a generic sense to apply both to a waveguide arrangement as in FIGURE 1 and to a coaxial cable arrangement as in FIGURES 2 to 5.

I claim:

1. A meter for indicating wave energy in a hollow-conductor waveguide comprising a thermopile formed of an even numbered plurality of hot junctions and a corresponding plurality of cold junctions formed between overlapping end portions of thin resistive strips, said strips being formed of metal films having a thickness which is small with respect to the skin-depth of the wave energy, the strip portions in which the hot junctions are formed extending in parallel relation between portions of said waveguide forming opposing boundaries of the electric field therein, whereby portions of said metal films on opposite sides of each hot junction are heated by the direct action of said field upon said strips, the cold junctions between said metal films being located outside of the boundaries of said electric field, and an isothermal mass maintained in good heat transfer contact with said cold junctions, said strips and the hot junctions formed thereby being electrically in series to provide a cumulative E.M.F. generated by the direct action of said wave energy on the thermopile circuit, wherein the amount of wave energy in said waveguide is indicated by a measurement of said E.M.F.

2. A meter according to claim 1 wherein said waveguide comprises a rectangular waveguide having a ridge arranged internally thereof along the middle of one broad wall, the elements of said thermopile being arranged transversely of said waveguide between the opposite broad wall and the edge portion of said ridge.

3. A meter for indicating wave energy in a hollow-conductor waveguide comprising a thermopile formed of a plurality of hot junctions and a corresponding plurality of cold junctions formed between overlapping end portions of thin resistive strips, said strips being formed of metal films having a thickness which is small with respect to the skin-depth of the wave energy, the strip portions in which the hot junctions are formed extending in parallel relation between portions of said waveguide forming opposing boundaries of the electric field therein, whereby portions of said metal films on opposite sides of each hot junction are heated by the direct action of said field upon said strips, the cold junctions between said metal films being located outside of the boundaries of said electric field, and an isothermal mass maintained in good heat transfer contact with said cold junctions, said waveguide comprises a coaxial cable having a tubular outer conductor and a center conductor, said metal film strips containing said hot junctions being arranged in a plane transversely of said coaxial cable and extending radially from said center conductor to said outer conductor, the outer and inner ends of said strips being connected to form two sets of cold junctions, the inner set of cold junctions being in good heat transfer contact with the inner conductor of said cable, and the outer cold junctions being in good heat transfer contact with an isothermal mass located outside of the internal wall of said tubular conductor.

4. A meter according to claim 3 wherein said isothermal mass comprises a metallic block surrounding the end of said tubular conductor and having a flat face transversely of the cable, said inner conductor extending into a bore formed in the flat face of said block of a larger diameter than the diameter of said outer conductor, said inner conductor having an enlarged section located within said bore and having a flat end face located in the plane of the flat end face of said block, a second metallic block having a flat face adjacent the flat end face of said first block and having a bore formed therein and effectively constituting a continuation of the bore in said first block, and means for clamping the second block to the first block with said thermopile interposed between said blocks, said outer cold junctions being located beyond the peripheries of said bores, and said inner cold junctions being located within the outer periphery of the enlarged section of center conductor and being held in close contact with the flat end of said conductor section.

5. A thermopile meter for sensing electromagnetic wave energy propagated along a coaxial transmission line having inner and outer conductors comprising, a plurality of spaced deposits of first thermoelectric material of defined shape, a plurality of spaced deposits of second thermoelectric material wherein individual ones of said last-mentioned deposits have the same shape as corresponding ones of said first plurality of deposits, said first and second plurality of deposits being supported in adjacent relationship in a plane transverse to the direction of wave energy propagation along said transmission line and having overlapping portions forming hot and cold junctions connected electrically in series, individual deposits of said first plurality being in reversed relationship about an axis through said transverse plane with respect to corresponding deposits of said second plurality, said hot junctions being located in the annular space between the surface boundaries formed by said inner and outer conductors for sensing the wave energy propagated along said transmission line, said cold junctions being outside said annular space, said deposits and said hot junctions are essentially in parallel with respect to the wave energy electrical field to provide a cumulative E.M.F. generated by the direct action of said wave energy on the thermopile circuit, wherein the amount of wave energy along said waveguide is indicated by a measurement of said E.M.F.

6. A thermopile meter for sensing electromagnetic wave energy propagated along a hollow-conductor waveguide having spaced interior conductive boundary surfaces comprising, a plurality of spaced deposits, alternate ones of said deposits being of first and second thermoelectric material, said deposits being supported in a plane transverse to the direction of wave energy propagation along said hollow-conductor waveguide and having overlapping portions forming symmetrically positioned hot junctions and a corresponding number of cold junctions, said hot junctions being located in the space between said waveguide boundary surfaces for sensing the wave energy propagated along said waveguide, all of said cold junctions being located outside of the space between said waveguide boundary surfaces, said deposits and the hot junctions formed thereby being electrically in series, individual deposits of said thermopile being in symmetrical relationship about an axis through said transverse plane with respect to similarly shaped deposits on the other side of said axis, said deposits and said hot junctions being essentially in parallel with respect to the wave energy electric field to provide a cumulative E.M.F. generated by direct action of said energy on the thermopile circuit, wherein the amount of wave energy along said waveguide is indicated by a measurement of said E.M.F.

References Cited in the file of this patent
UNITED STATES PATENTS

| | | |
|---|---|---|
| 2,468,775 | Ovrebo | May 3, 1949 |
| 2,667,618 | Waller | Jan. 26, 1954 |
| 2,859,406 | Jaffe | Nov. 4, 1958 |

OTHER REFERENCES

O.S.R.D. Report No. 4415, Harris et al., March 31, 1943.